US008793956B2

(12) United States Patent
Leopolder et al.

(10) Patent No.: US 8,793,956 B2
(45) Date of Patent: Aug. 5, 2014

(54) MULTI-POSITIONABLE WALL OR CEILING PANEL

(75) Inventors: Christian Leopolder, Lampertswalde (DE); Maik Moebus, Lampertswalde (DE)

(73) Assignee: Kronoplus Technical AG, Niederteufen (CH)

( * ) Notice: Subject to any disclaimer, the term of this patent is extended or adjusted under 35 U.S.C. 154(b) by 1304 days.

(21) Appl. No.: 11/570,710

(22) PCT Filed: Mar. 21, 2005

(86) PCT No.: PCT/EP2005/051284
§ 371 (c)(1),
(2), (4) Date: Aug. 21, 2007

(87) PCT Pub. No.: WO2005/124052
PCT Pub. Date: Dec. 29, 2005

(65) Prior Publication Data
US 2008/0263987 A1    Oct. 30, 2008

(30) Foreign Application Priority Data

Jun. 17, 2004 (DE) .......................... 10 2004 029 233

(51) Int. Cl.
*E04F 13/08* (2006.01)
*E04B 1/62* (2006.01)
*E04B 2/00* (2006.01)
*F16B 7/00* (2006.01)
*E04B 1/26* (2006.01)
*F16D 1/00* (2006.01)

(52) U.S. Cl.
USPC .......... 52/588.1; 52/592.1; 52/392; 52/586.1; 52/395; 403/294; 403/298; 403/364; 403/381

(58) Field of Classification Search
USPC .................. 52/392, 586.1, 395, 592.1, 592.2, 52/588.1, 589.1, 591.1, 591.2, 592.4, 581, 52/578, DIG. 16; 403/292, 294, 298, 364, 403/381
See application file for complete search history.

(56) References Cited

U.S. PATENT DOCUMENTS 4,599,841 A    7/1986 Haid
6,209,278 B1 *  4/2001 Tychsen ....................... 52/592.4
(Continued)

FOREIGN PATENT DOCUMENTS

EP    0196672    10/1986
EP    1262313    5/2002
(Continued)

*Primary Examiner* — Brian Glessner
*Assistant Examiner* — Omar Hijaz
(74) *Attorney, Agent, or Firm* — Renner, Otto, Boisselle & Sklar, LLP

(57) ABSTRACT

The invention relates to a panel which is suitable for use as wall and/or ceiling paneling, in addition to an associated method for laying said panels and a method for the production thereof. The inventive panel for a wall or ceiling comprises coupling means. The coupling means are embodied in such a way that the panel can be joined to other panels in various positions. Said positions can, for example, involve various distances between the longitudinal edges of two panels that are arranged in parallel. According to the inventive laying method, a first panel is engaged with a second panel in a first step, whereupon the panels assume an angular position in relation to each other. At least one of the panels, particularly the first panel, is pivoted in a second step on a common plane, whereupon the panels become locked in relation to each other.

14 Claims, 3 Drawing Sheets

(56) References Cited

U.S. PATENT DOCUMENTS

Figure 1:
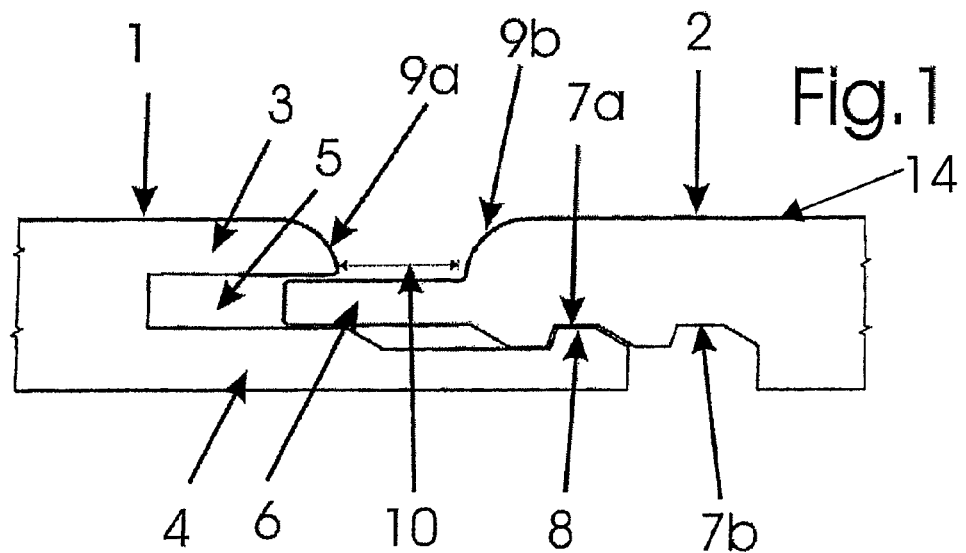

| | | | |
|---|---|---|---|
| 6,363,677 B1 * | 4/2002 | Chen et al. | 52/586.1 |
| 6,588,166 B2 * | 7/2003 | Martensson et al. | 52/578 |
| 6,658,808 B1 * | 12/2003 | Doherty et al. | 52/580 |
| 6,804,926 B1 * | 10/2004 | Eisermann | 52/592.1 |
| 6,955,020 B2 * | 10/2005 | Moriau et al. | 52/592.2 |
| 7,040,068 B2 * | 5/2006 | Moriau et al. | 52/591.3 |
| 7,451,578 B2 * | 11/2008 | Hannig | 52/586.1 |

FOREIGN PATENT DOCUMENTS

| | | |
|---|---|---|
| EP | 1359266 | 11/2003 |
| FR | 2205961 | 5/1974 |
| GB | 2256023 | 11/1992 |
| WO | 00/28171 | 5/2000 |
| WO | 01/96689 | 12/2001 |
| WO | 02/33197 | 4/2002 |

* cited by examiner

MULTI-POSITIONABLE WALL OR CEILING PANEL

This application is a national phase of International Application No. PCT/EP2005/051284 filed Mar. 21, 2005 and published in the German language.

The present invention relates to a panel, which is suitable for a covering for a wall and/or ceiling as well as to a related method for laying the same. Such panels preferably comprise wood material, but they may also be made from metal and/or plastics. Known panels for walls or ceilings are provided with a groove and a tongue connection on their longitudinal sides, whereby adjacent similar panels may be assembled to a surface in a form-fitting and interengaging manner. The known panels are fastened to wall or ceiling by means of clamps or a staple gun. During stapling of the panels, the optical appearance, which is provided by the surface of the panels, is often adversely affected.

From the prior art a panel for a wall is further known onto which metallic clamps may be clipped for connecting the same with other panels. By means of the clamps, the spacing between the connected panels may be varied. Due to the usage of additional clamps, the application of the panels is, however, time and cost consuming and the logistic complexity associated therewith is increased.

With regard to the above-described disadvantages, it is thus the object of the present invention to provide a panel with improved connecting, respectively laying properties, as well as a corresponding application and related laying method.

This object is solved by means of the generic device with the features of claim 1 by means of its usage according to claim 15, a laying method according to claim 16 as well as a manufacturing method according to claim 17. Advantageous embodiments are given in the dependent claims.

The panel according to the invention for a wall or a ceiling is provided with coupling means. The coupling means are formed such that a panel may be connected with another panel in multiple different positions with respect to each other. For example positions with different distance between the longitudinal edges of two panels, which are arranged in parallel to each other. In this way, it can be achieved that the distance of the panels may be varied depending on the area to be covered, in particular without the need for any further tools, to influence on the one hand the necessary number of panels for a given area to be covered. Since additional tools, like e.g. clamps, are not necessary, the logistic complexity, which is related to storing, transport and application of the panels, is advantageously reduced.

On the other hand, the optical appearance, which derives from the different spacing of the panels may be influenced. For example, the panels may lie close together to form a closed surface when viewed upon or the panels may show a recess running between the panels in coupled condition, by means of which the panel structure of an area covered with the panels is optically emphasized. The coupling means formed in this way may be provided both on the longitudinal side as well as on the narrow side. Further, different, i.e. conventional or even no coupling means may be provided on the narrow side.

In a further preferred embodiment of the panel according to the invention, coupling means are provided with a groove formed by two lips on the one side of the panel and a tongue on the other side of the panel. In this case, the tongue is formed such that it may be moved into the groove of another panel. A groove and tongue connection is particularly easy and cost efficient to make, e.g. by means of milling of the panels. Such a connection may be provided particularly easily in a continuous panel-manufacturing process.

According to a further advantageous embodiment, one of the two lips is longer than the other. In this way, it is on the one hand achieved that the lip is easily accessible for machining. In this way, during the manufacturing process of the panels, recesses and projections may easily be provided in the protruding lip. On the other hand, the protruding lip facilitates the connection of multiple panels. For example, the tongue of an angled panel may easily be arranged onto the protruding lip, to slide over this lip effortlessly into the corresponding groove. In this way, the assembly of panels is simplified. When mounting to walls and ceilings, it is a particular advantage to provide an insertion aid made in this way, since it is particularly difficult to correspondingly align the panel during this form of mounting.

In one embodiment, the projecting lip is thus on the underside of the panel, that means on the side of the panel, which faces to the ceiling or the wall when correctly applied. In this way, next to the above-described advantageous effect, the optical impression of the installed panels is not negatively affected by the coupling elements.

In a further advantageous embodiment, at least one element of the locking means is arranged on the coupling means. In this way, it is achieved that the locking element may be provided with the panels together with the coupling means during the manufacturing process. If for example a locking element is provided on the long lip of the groove, a slightly angular position of the panel with respect to this lip may advantageously be sufficient to disable the locking. If for example the connection to another panel is to be established by means of groove and tongue, this angled position is sufficient that the locking means are not engaged with each other, and the establishing of a connection is facilitated. On the other hand, the angular position leads to a release of the locking of connected panels, so that two panels may be separated from each other easily, when positioned in this angular arrangement.

To achieve this angled position comparatively easily, in one embodiment the coupling means may be provided overall or in contacting areas in an elastic configuration. In one embodiment, the recesses as well as the projecting lip are arranged on the underside of the panel, i.e. on the side of the panel, which faces the wall or the ceiling, when the panel is correctly applied. In this way, the optical impression of the installed panels is not negatively influenced by the locking means.

A further advantageous embodiment of the panel according to the invention provides that the locking means are shaped such that they engage each other. In this way, a locking is provided in a particularly simple manner, which may also be released easily.

In a further advantageous embodiment, the locking means comprise one or more recesses and projections respectively lugs. For example, in one embodiment, two recesses and one projection are provided. The projection has a cross-section which allows it to engage one of the recesses.

To facilitate the insertion of the projection into the recess, the projection may be more angled on the one side, which is arranged ahead in the connection direction, compared to the opposite side. The opposite side should be angled in such a way that in combination with the respective recess, a sufficiently strong locking is achieved.

In a further embodiment, the locking means could further be provided elastically, to facilitate the locking.

A further preferred embodiment provides that the locking means are arranged continuously along the longitudinal sides of the panel. For example, one or more recesses could be provided on the longitudinal side of a panel, in the form of a groove. In this way, the same can e.g. be machined into the panels by means of a milling action. Therefore, such a panel can be produced in a particularly simple manner by means of a continuous production process. On the other hand, due to the relatively large locking surface, a particularly effective locking is achieved.

For example, the projection and the corresponding recess could be relatively small in cross-section and nevertheless a sufficiently strong locking may be achieved due to the extending shape of projection and recess along the panel. Projections and recesses with a small cross-section are particularly advantageous with thin panels.

According to a further embodiment, the locking means are provided with a plurality of elements spaced in the connecting direction of the panels. For example, the elements could be two recesses, arranged in parallel along the panel and being offset with respect to each other. In one embodiment, they are provided on the side of the panel, which is provided with the tongue. A projection, arranged along the panel, which is provided on the projecting groove-forming lip can alternatively be locked in these recesses. By means of the offset elements, it can particularly easily be achieved that the distance of the panels may be varied depending on the surface to be covered, in order to influence the necessary number of panels for a given surface to be covered. Further, the optical impression which derives from the different spacing of the panels may be changed. For example, the panels could be arranged close to each other, by locking the projection in one embodiment into the recess, which is distant to the longitudinal edge. In this way, a relatively closed surface is achieved. Alternatively, the panels may be connected spaced apart from each other, compared to the above-described arrangement, and may be provided with a recess between panels, when the projection is locked into the recess, which is directly adjacent to the longitudinal edge. In this way, a panel structure of a surface covered with the panels is optically emphasized.

According to a further embodiment, the coupling means and/or locking means are shaped such that the panels are slidable against each other in longitudinal direction when in connected condition.

In one embodiment, they are for example shaped such that the panels may be moved in a rail-like manner against each other. In this way, it is achieved that with connected panels an extension or shortening of the length does e.g. in the case of wooden panels not lead to a warping or even damaging of the panels.

In a further embodiment, the coupling means and/or the locking means are shaped such that the same are provided with a play in at least one direction. In this way, the movability may be secured respectively the necessary forces for the same may be reduced. Further, shrinkage as well as expansions may be balanced. A play between the groove and the tongue allows that the above-described angled position of two panels with respect to each other can be achieved particularly simply. The play may be equal between the groove and the tongue, or alternatively the groove may be widened in the insertion direction. A play between the locking means serves to balance expansions and shrinkage of the panels. A play at the free end of the protruding lip of the groove serves in one embodiment for the fastening of a clamp, by means of which the panel may be fastened to wall or ceiling. By providing clamps for the fastening of the panel, the same can be fixed, e.g. by means of nailing, stapling or a screw connection without damages to the surface of the panel. Further, the panel need not be provided with additional milled recesses, to fix the clamps.

In a further embodiment, the panel consists of a wooden fiberboard. Thus, on the one hand, the panel is relatively inexpensive to produce. On the other hand, it is comparatively very resistant to deformation, very stress resistant and can be produced with a high precision. The panel can be produced in one piece from a fiberboard.

A further preferred embodiment provides that the panel is provided at least on one side with rounded edges or cutoff edges. Cutoff edges in the meaning of the invention can, e.g. be achieved by providing rectangular or square edges, with one or more leveled faces by means of milling. In this way, the risk of injury is reduced.

In one embodiment, the edges, which border the top side of the panel are rounded or cutoff, i.e. on the side of the panel which is arranged remote from the wall or the ceiling, when correctly applied. In particular with wall panels the risk of injury for humans and the risk for damaging of clothing can be reduced by providing the above-described feature in a particularly advantages manner. Further, it is achieved that small differences in the arrangement of the topside of the panels, which might e.g. be caused by tolerances in the production, do not stand out, since the topsides of the panels do not directly merge into each other, but they are divided by the rounded, respectively cutoff edges. In this way, the manufacturing process is simplified since e.g. tolerances with regard to the milling action are reduced.

In a further preferred embodiment, the panels are provided on at least one side with a décor layer. For example, this could be a décor paper, which is provided with a wood grain. The décor paper can have different colorings and/or structures according to the desired optical effect. In addition to the optical effect, it may function as protection of the panel against moisture. Further, it can be achieved that a painting of the panels with regard to optical or protective aspects can advantageously be avoided after application onto a wall or ceiling.

In one embodiment, the décor layer is only provided essentially on the top side of the panel, thus on that side of the panel which is arranged distant to the wall or ceiling, when correctly applied.

According to a further embodiment, the coupling means are at least partly covered by a décor layer. In this way, it can be achieved that the décor layer is additionally fixed by means of the coupling means. A release of the usually glued-on décor layer can thus further be avoided. The sliding or gliding properties of the décor layer are preferably improved compared to the abutting surfaces of wood materials, since this has a positive effect on the slidability in longitudinal direction of the connected panels.

The panel according to the invention according to any one of the above described embodiments is advantageously used as a covering for walls and/or ceilings.

The laying method according to the invention provides that in a first step a first panel is brought into engagement with a second panel, and whereby the panels are arranged in an angled position with respect to each other. In a second step, at least one of the panels, in particular the first panel, is pivoted in a common plane, thus establishing a locking between the panels. By means of the achieved locking, the panels can be advantageously simply connected. For example, the first panel may be provided with a groove, formed from two lips, into which the tongue of the second panel may be inserted. One of the lips projects for example. In this way, the tongue of the angled panel is arranged onto the projecting lip, so that the same can be brought into the respective groove by means of a sliding operation in a particularly simple manner. In the angled position, the locking means of the panels are not engaged and do thus not hinder the establishing of the connection. By pivoting the panels into one plane, the locking means engage, and lock e.g. into place and thus secure the connection of the panels.

The invention further relates to a manufacturing method for a panel, according to any one of the above described embodiments, wherein the panel is in a first step provided at least on the longitudinal sides with rounded or cut-off edges, in a second step the panel is provided on one side with a décor layer and in a third step, the coupling means and/or locking means are milled into the panel. Thereby, the panel can be produced in a simple and cost efficient manner into one of the above described embodiments.

In a further preferred embodiment, the panel rests in the third step on the side, which is not provided with a décor layer. For example, the panel rests on a surface of the milling machine. In this way, it is achieved that the comparably delicate décor layer is not damaged during the machining.

WITH REGARD TO THE FIGURES

FIG. 1 shows two panels 1, 2 in cross-section, which are connected in a first position. The panel 1, which has a decor layer 14 on one side, is provided with two lips 3, 4, by means of which the groove 5 arranged there-between is formed. The tongue 6 of the second panel 2 can be brought into the groove 5. Groove 5 and tongue 6 form the coupling means of panels 1, 2. The lip 4 of the panel 1 projects further than the lip 3. A projection 8 is provided on the outer edge of the panel 1, respectively the lip 4, which extends along the panel 1. The projection 8 can be locked in one of the two recesses 7a, respectively 7b. The same form the locking means of the panels 1, 2. The recesses 7a, 7b extend along the longitudinal edge of panel 2 and are arranged parallel with respect to each other. The recess 7a is arranged in close relationship to the edge of panel 2, whereas the recess 7b is arranged further away with respect to the edge of panel 2. In FIG. 1, it is shown how projection 8 engages in the recess 7a, which is next to the edge of panel 2, and thus locks panels 1, 2 with each other. In this way, panels 1, 2 can be locked within a distance from each other and the surface covered by panels 1, 2 is enlarged. A recess 10 is formed between the edges 9a and 9b, wherein the distance between the edges is for example 7.5 mm. The recess 10 extends along the panels 1, 2 and contributes to the optical effect of the same. Edges 9a and 9b are rounded. In FIG. 1, the lower sides of panels 1 and 2 are those sides which abut the wall respectively the ceiling after application onto a wall or ceiling.

Figure 2:
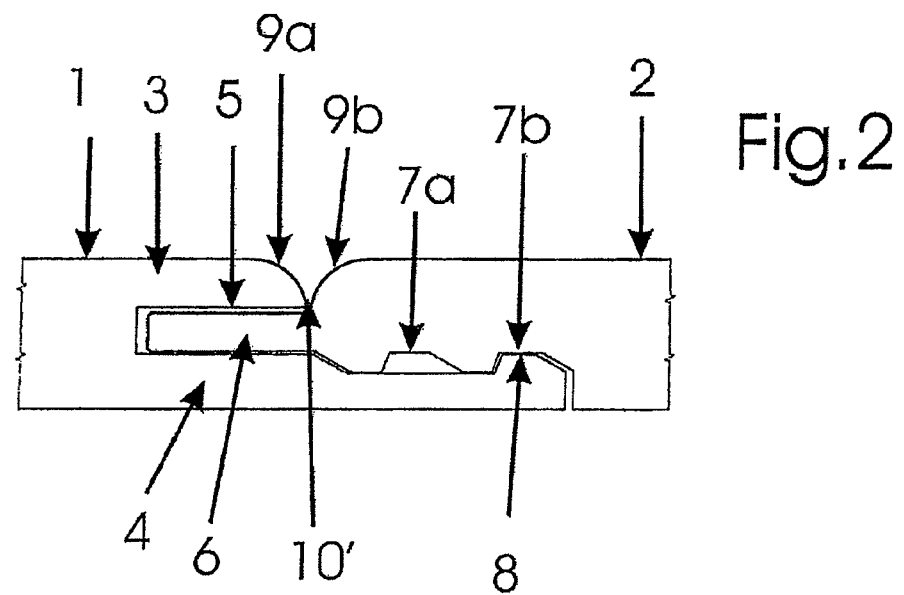

FIG. 2 shows the two panels 1, 2 of FIG. 1 in a cut view, which panels are connected in a second position. Panel 1 is provided with two lips 3, 4, by means of which a groove 5 is formed there-between. Tongue 6 of the second panel 2 may be inserted into groove 5. Groove 5 and tongue 6 form the coupling means of panels 1, 2. Lip 4 of panel 1 projects further than lip 3. A projection 8 is provided on the outer edge of panel 1, respectively the lip 4, which extends along panel 1. Projection 8 can be locked in any one of the recesses 7a, respectively 7b. The same form the locking elements of panels 1, 2. The recesses 7a, 7b extend along the longitudinal edge of panel 2, and are arranged in parallel to each other. The recess 7a is in close relationship to the edge of panel 2, whereas the recess 7b is arranged further away from the edge of panel 2. In FIG. 2, it is shown how projection 8 engages into recess 7b, which is arranged distant to the edge of panel 2, and locks the panels 1, 2 with each other. In this way, panels 1, 2 are locked close with respect to each other and the surface covered by panels 1, 2 is comparably small. Between the directly adjacent edges 9a and 9b, a recess 10' is formed. The recess 10' runs along the panels 1, 2 and contributes to the optical effect of the same. The edges 9a and 9b are rounded. In FIG. 2, again the lower sides of panels 1 and 2 are those sides which abut the wall respectively ceiling after application onto a wall or ceiling.

Figure 3:
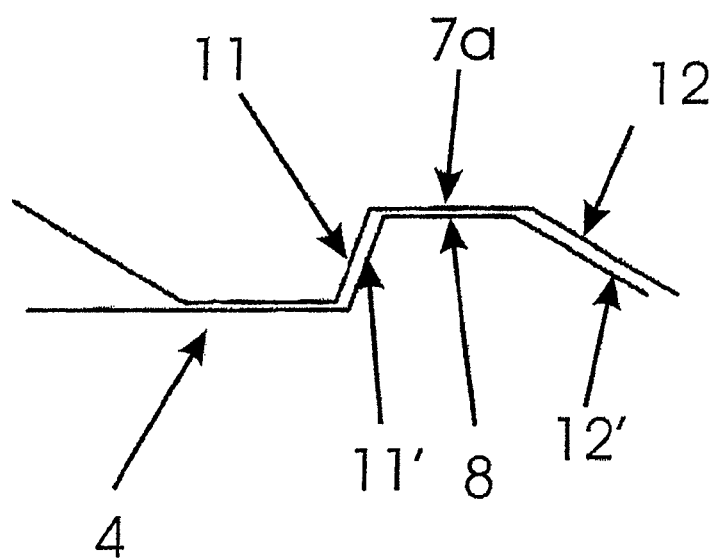

FIG. 3 is a detailed view of FIG. 1. Projection 8 of lip 4 is engaged in recess 7a and thus locks two panels with each other. The cross-section of projection 8 is formed such that it can engage the recess 7a. To facilitate the projection 8 into recess 7a, the projection 8 provided on the side 12' which is in connecting direction arranged ahead, is more angled compared to the opposite side 11'. The same is true for the corresponding sides 11 respectively 12 of recess 7a. Sides 11 respectively 11' are angled in such a way that on the one hand they provide in combination with the recess a sufficiently strong locking and on the other hand allow an easy angling of the panels with respect to each other, such that the locking by means of elements 7a, respectively 8, can be released in a simple manner. The locking elements 7a, 8 in this embodiment are provided with play, to allow a displacement of the panels with respect to each other. The play should e.g. be from 0.2 mm to 0.5 mm.

Figure 4:
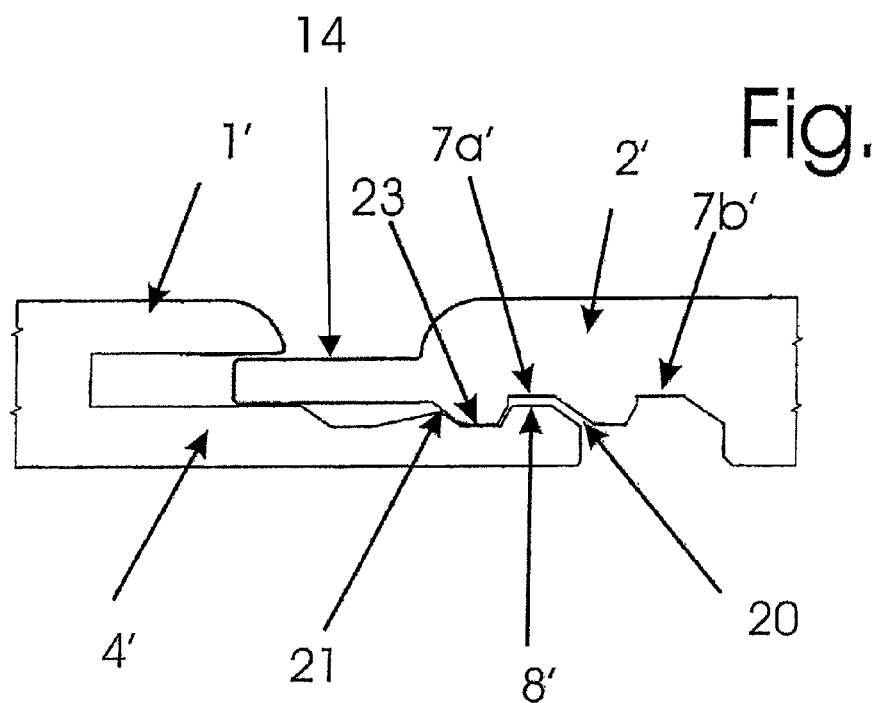
Figure 5:
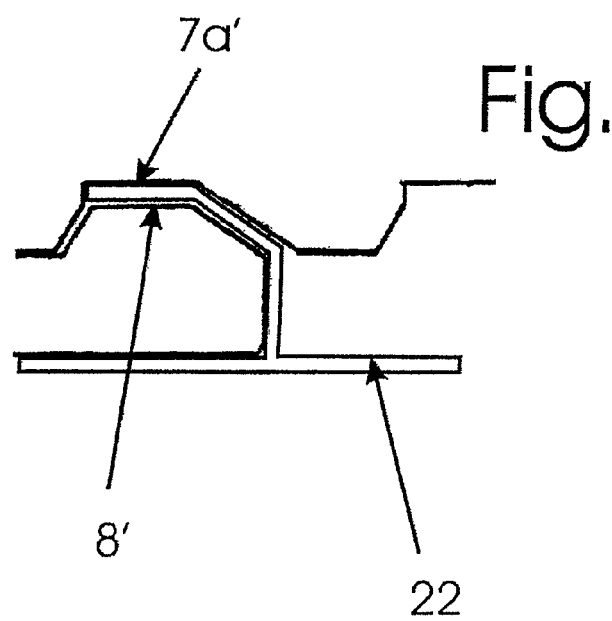

FIG. 4 shows two panels 1', 2' according to a further embodiment of the invention in a sectional view, which panels are connectable in two positions, of which one is shown. Panel 1' is provided with two lips, by means of which a groove is formed there-between. The tongue of the second panel 2' can be inserted into the groove. Groove and tongue form the coupling means of panels 1', 2'. The lip 4' of panel 1' projects further than the other lip. A projection 8' is provided on the outer edge of panel 1' respectively of the lip 4', which projection runs along panel 1'. Projection 8' can be engaged in one of the recesses 7, 8', 7b', respectively of panel 2'. In the embodiment shown, it is engaged in recess 7, 8'. The same form the locking means of panels 1', 2'. The recesses 7a', 7b' extend along the longitudinal edge of panel 2' and are arranged in parallel with respect to each other. Recess 7a' is arranged in close relationship to the edge of panel 2', whereas recess 7b' is arranged further distant to the edge of panel 2'. Once projection 8' is engaged in the recess 7a', respectively 7b', a play 20 remains. This play 20 serves among others for the reception of the clamp 22, which is shown in FIG. 5 in a detailed view. This clamp 22 allows a simplified fastening of wall panel 1' and thus also of panel 2' onto a wall or ceiling. To prevent that play 20 leads to a loose locking in the direction of the groove and tongue connection, the locking means are further provided with an additional projection 21 at the lip 4' of panel 1', which lock with a protruding projection 23 of panel 2'.

The invention claimed is:

1. A wall or ceiling covering panel having on one side a groove formed between two lips and on an opposite side a tongue which is formed such that it can be inserted into the groove of a further similarly formed panel and connected therewith in multiple different positions, wherein the two lips have at least one locking element and the tongue has at least one locking element, the locking elements being configured to lockingly engage one another in the multiple different positions to lock together the tongue and groove in the multiple different positions, respectively, such that a spacing of the panel relative to the further panel can be correspondingly adjusted with at least one of the multiple different positions allowing the tongue to be viewed between the panel and further panel, and a decor layer provided on and at least partially covering the tongue.

2. The wall or ceiling covering panel according to claim 1, wherein one of the lips is longer than the other lip.

3. The wall or ceiling covering panel according to claim 1, wherein the locking elements comprise one or more recesses and projections.

4. The wall or ceiling covering panel according to claim 1, wherein the locking elements extend continuously along longitudinal edges of the panel.

5. The wall or ceiling covering panel according to claim 3, wherein the one or more recesses and projections include two recesses that are offset with respect to one another in a connecting direction of the panels and two projections that are offset with respect to one another in a connecting direction of the panels.

6. The wall or ceiling covering panel according to claim 1, wherein the tongue and groove and/or locking elements are shaped such that the panels in connected condition are slidable with respect to each other in a longitudinal direction.

7. The wall or ceiling covering panel according to claim 1, wherein the tongue and groove and/or locking elements are shaped such that they comprise a play in at least one direction.

8. The wall or ceiling covering panel according to claim 1, which consists of a wooden fiberboard.

9. The wall or ceiling covering panel according to claim 1, which comprises at least on one side rounded or cutoff edges.

10. A method for laying the panel according to claim 1 over a wall or ceiling, the method comprising:
bringing a first panel into engagement with a second panel, wherein the panels are set in an angled position with respect to each other, and pivoting at least one of the panels into a common plane with the other panel, thereby achieving a locking of the panels.

11. A method for production of a panel according to claim 1, the method comprising:
providing at least a longitudinal side with rounded or cutoff edges,
providing one side with the decor layer, and
milling the tongue and groove and/or locking elements into the panel.

12. A method according to claim 11, wherein during milling the panel rests on its side, which is not provided with a decor layer.

13. A wall or ceiling assembly comprising a wall or ceiling and plurality of interconnected panels according to claim 1 covering the wall or ceiling.

14. A method according to claim 10, wherein pivoting at least one of the panels includes pivoting the first panel.

* * * * *